Patented May 28, 1940

2,202,038

UNITED STATES PATENT OFFICE 2,202,038

ACID GREEN INDOLYLDIPHENYLMETHANE DYESTUFF

Paul Wolff and Emil Beniers, Frankfort-on-the-Main, Germany, assignors to General Aniline & Film Corporation, a corporation of Delaware No Drawing. Application May 13, 1938, Serial No. 207,788. In Germany May 24, 1937

3 Claims. (Cl. 260—319)

The present invention relates to acid green indolyldiphenylmethane dyestuffs; more particularly it relates to compounds of the following general formula:

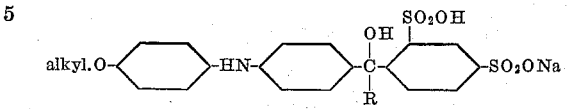

wherein R represents N-alkyl-indole radical bound in its β-position to the methane carbon atom and containing in its alpha-position a phenyl radical.

We have found that acid green indolyldiphenylmethane dyestuffs having valuable properties are obtained by condensing a 4'-halogenbenzophenone-2-sulfonic acid with an indole compound which is unsubstituted in beta-position and contains in α-position a substituent, such as for instance, a phenyl group or a substituted phenyl group, a methyl group or an ethyl group, sulfonating the condensation product and causing the halogen atom standing in 4-position to the methane carbon atom to react with a primary aromatic amine containing in para-position to the amino group an alkoxy group, for instance, a methoxy group or an ethoxy group.

The practicability of the present process could not be foreseen since in the benzophenone compounds used as starting materials there is in ortho-position to the keto group a sulfonic acid group which might have a detrimental effect on the condensation to the indolyldiphenylmethane dyestuffs. In comparison with the known dyestuffs, the dyestuffs obtainable according to the present invention are distinguished by the fact that they yield more even and more beautiful dyeings.

The following examples serve to illustrate the invention, but they are not intended to limit it thereto:

(1) 1 mol. of sodium-4'-chlorobenzophenone-2-sulfonate (obtainable by condensing, according to Friedel Craft's reaction, ortho-sulfobenzoic anhydride with chlorobenzene in the presence of aluminium chloride) is condensed with 1 mol of 1-methyl-2-phenylindole by heating for 15 to 20 hours at about 45° C. to 50° C. in an excess of chlorosulfonic acid whereby simultaneous sulfonation to the disulfonic acid occurs. The condensation product is precipitated by pouring the whole into water and is washed until free from acid, dried and heated together with an excess of paraphenetidine at 120° C. for several hours, for instance, 2 to 3 hours, after elimination of the excess of paraphenetidine by means of dilute hydrochloric acid a dyestuff is thus obtained which, in the form of its sodium salt dyes wool and silk bluish-green tints of very good fastness to light. The dyestuff probably has the following constitution:

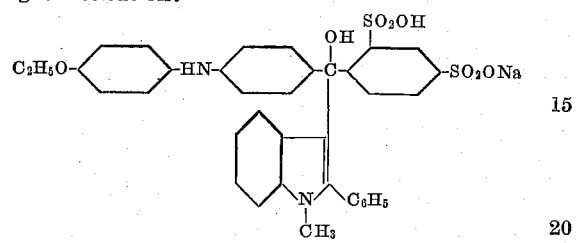

(2) If in the process of Example 1 the 1-methyl-2-phenylindole is exchanged for the 1-isobutyl-2-para-chlorophenyl-4,6-dimethylindole, a dyestuff is obtained which in the form of its sodium salt dyes wool and silk green tints of very good fastness to light. The dyestuff probably has the following constitution

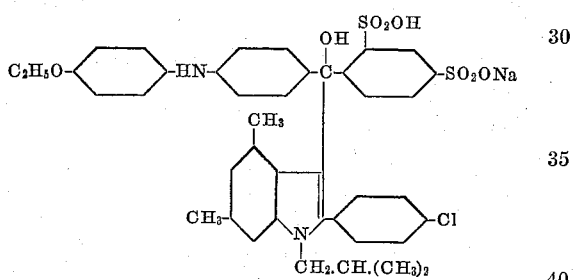

We claim:

1. The compounds of the general formula:

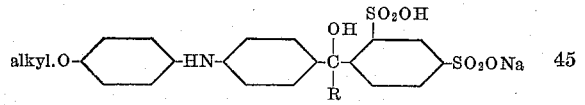

wherein R represents an N-alkyl indole radical bound in its β-position to the methane carbon atom and containing in its α-position a phenyl radical, said compounds being acid dyestuffs yielding greenish tints of good fastness properties.

2. The compound of the formula:

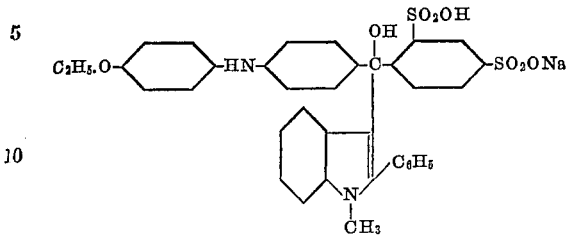

said compound being a dyestuff dyeing wool and silk bluish-green tints of very good fastness to light.

3. The compound of the formula:

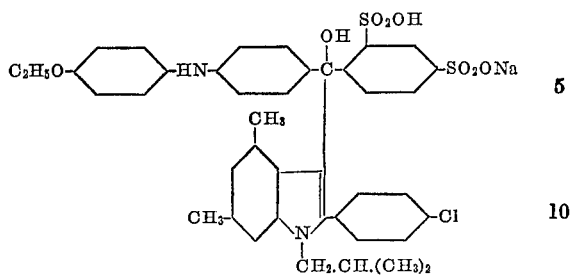

said compound being a dyestuff dyeing wool and silk green tints of very good fastness to light.

PAUL WOLFF.
EMIL BENIERS.